Nov. 10, 1936. C. SEIPPEL 2,060,535
AUTOMATIC REGULATING SYSTEM FOR PRESSURE FIRED STEAM BOILERS AND THE LIKE
Filed Aug. 31, 1935
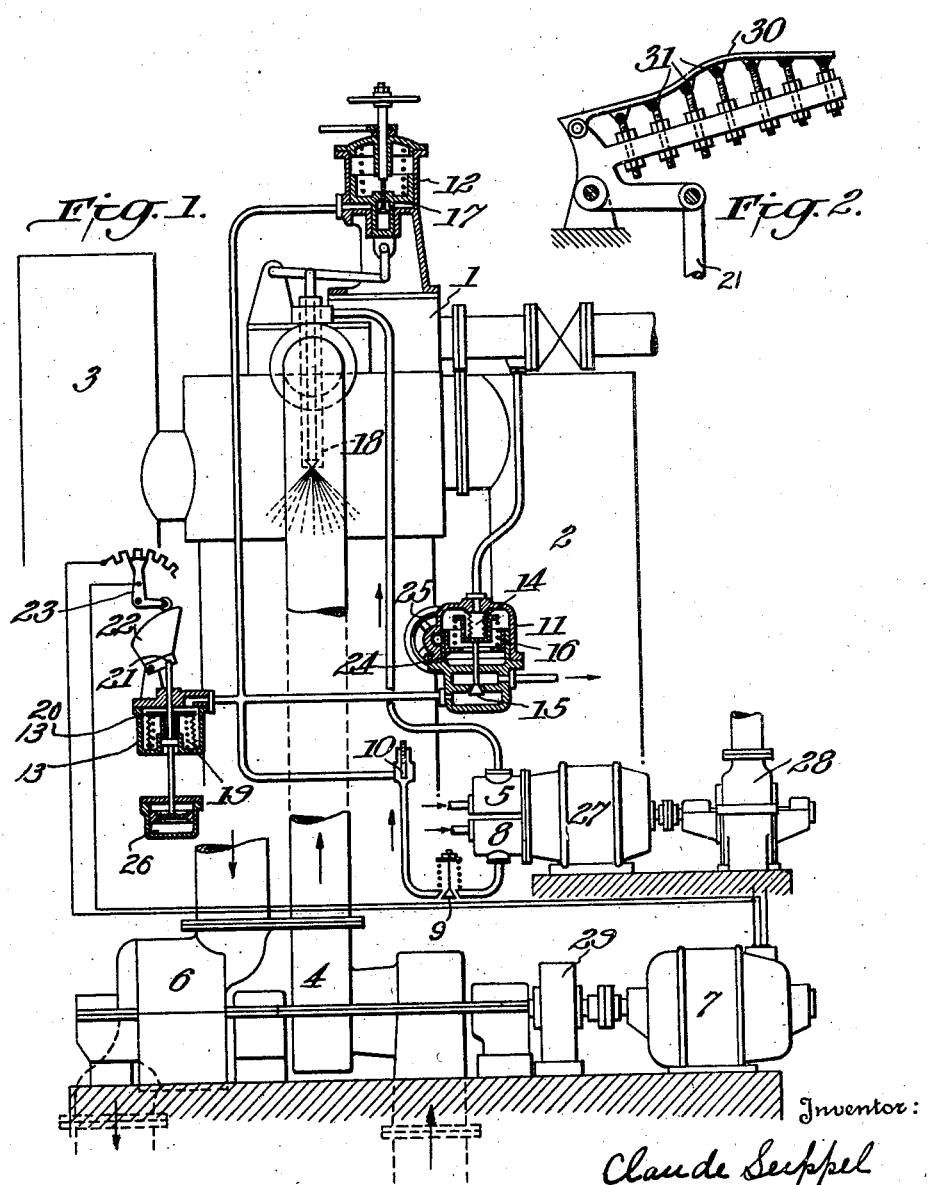
Inventor:
Claude Seippel
By Potter, Pierce & Scheffler
Attorneys.

Patented Nov. 10, 1936

2,060,535

UNITED STATES PATENT OFFICE 2,060,535

AUTOMATIC REGULATING SYSTEM FOR PRESSURE-FIRED STEAM BOILERS AND THE LIKE

Claude Seippel, Ennetbaden, Switzerland, assignor to Aktiengesellschaft Brown, Boveri & Cie., Baden, Switzerland Application August 31, 1935, Serial No. 38,819
In Germany September 14, 1934

8 Claims. (Cl. 236—26)

The automatic regulation of an ordinary steam boiler is accomplished ordinarily by controlling the supply of fuel and air with reference to some corresponding variable such as the steam pressure. The steam pressure acts on devices which, for instance, change the number of revolutions of the fuel pump, or the grate drive, and the number of revolutions of the air fan. Since these feed devices are driven by a simple and entirely controllable motive force (a motor), to which energy is supplied from an outside and constant source, the regulating mechanism is comparatively simple.

The conditions are quite different in pressure fired furnaces, particularly when the pressure in the fire chamber is produced by a compressor which is driven by a gas turbine, which in turn is driven by the outgoing combustion gases. The whole or the greater part of the energy for operating the compressor can be furnished by the gas turbine, but nevertheless additional driving energy is necessary for compensating the difference between the power generated by the gas turbine and the power consumed by the compressor, and, above all, for controlling the speed of the turbine and the compressor. Since the power of the gas turbine depends entirely on the amount of flue gas and on the temperature of the same, and the temperature of the flue gas can be changed only slightly and an increase or decrease in the amount of flue gas is always associated with a similar increase or decrease in the power consumption of the compressor, there is too little power available from the gas turbine for obtaining a rapidly adjusted regulation. It is advisable, therefore, to use an auxiliary motor that furnishes the power necessary for equalizing the power output of gas turbine and the power consumption of the compressor and for accelerating or retarding the two for the purpose of regulation. It should be observed here that the power consumption of the compressor, which is generally a turbo machine, is determined primarily by the number of revolutions thereof, and therefore it could be used directly for the regulation, but that the power output of the gas turbine is not constant, since this output is dependent on variable conditions, such as temperature of the air being drawn in, temperature of the flue gases, resistances to flow, etc. To be capable of use for the regulation, therefore, the auxiliary motor must be able to furnish power varying within wide limits, without material variation in speed. By experiment and theoretical calculation it has been ascertained that electric motors which possess the shunt characteristics and the speed of which can be varied by varying the field exciter current, the terminal voltages, the brush adjustment or the like, are suitable for this purpose.

In the regulation of furnaces, generally the air for combustion is not regulated directly, but is influenced indirectly, i. e. by changing the amount of fuel. The present invention goes farther in that the auxiliary motor is regulated directly, i. e. in direct dependence on the conditions of operation to be regulated. The conditions of operation to be regulated can be the steam pressure, or the amount of steam produced. The regulation, however, can be accomplished directly from the load of the turbine driven by the steam from the boiler, from its speed regulator, or from the switchboard.

In the accompanying drawing, Fig. 1 is a diagrammatic illustration of an embodiment of the invention, and Fig. 2 is a vertical front elevation of the means for determining the shape of the curved track 22 of Fig. 1.

Referring to the drawing, numeral 1 indicates a steam boiler of the Velox type, for instance; 2 is the superheater and 3 the steam separator of the same. The air for combustion is furnished by the compressor 4 and the fuel by the pump 5. The compressor is driven by a gas turbine 6, the driving fluid of which is the flue gases coming from the superheater 2. The gas turbine is aided by a motor 7 which, for producing a suitable regulation according to the invention, is a motor with shunt characteristics, with its number of revolutions regulated by means of auxiliary apparatus in direct dependence, for instance, on the steam pressure. For transmitting the regulating forces, use is made in the known way of oil under pressure, that is, furnished by a pump 8, and kept under a definite pressure by the pressure limiting valve 9, and throttled down by the adjustable throttling device 10 to the pressure suitable for the auxiliary apparatus in question. The auxiliary apparatus is the regulator 11, which is controlled by the boiler steam pressure, the regulator 12 for the fuel supply, and the regulator 13 for the air supply. If the steam pressure changes due to change in the requirements for steam, the pressure changes inside the metal bellows 14 so that the valve 15 is opened more or less under the action of the spring 16. More or less oil can, therefore, flow off, with the result that in the whole system, after the throttling device 10, a different oil pressure prevails. The pressure therefore on the driving plunger 17 of the fuel regulator 12 becomes different so that the regulating needle of the fuel injection nozzle 18 sprays into the fire chamber more or less fuel that has been put under high pressure by the fuel pump 5.

Simultaneously with the adjustment of the injection nozzle 18, however, there is adjustment of the air supply regulator 13, in that here likewise the tension of the spring 19 and of the oil pressure on the plunger 20 tend to move the plunger to a new position of equilibrium. To the plunger is connected a lever 21 with a curved track 22, the profile of which is of such shape that the position of the lever 23 caused by the curved track produces a regulation of the motor 7 to a different speed. If the motor is a direct current motor, for instance, the excitation is changed by the introduction of resistances; if the supply of current is through a Ward-Leonard drive, i. e. if the motor is fed by a generator of its own with voltage that can be regulated within wide limits, the lever 23 influences the field excitation of the generator. In three-phase commutator motors the brush adjustment can be accomplished by lever 23. In spite of the fact that the motor furnishes only a fraction of the driving power of the compressor 4, its comparatively great available power, at constant or nearly constant speed, makes it possible to impart to the compressor the number of revolutions that is necesary for delivering the required amount of air. In this connection the curved track 22 can be so constructed by experiment that all conditions of operation of the compressor found to be advisable or economical with the different loading of the boiler are met. In order to find the most satisfactory shape of curved track, it can be made of an elastic steel band 30 according to Fig. 2, the curves of which are formed by adjustable supporting screws 31.

In order to be able to operate a steam boiler at different steam pressures, the supporting plate 24 of the spring 16 of the regulator 11 can be adjusted by screws or teeth and the hand wheel 25.

It is advisable to damp the action of the regulating system to avoid sudden changes in the load. Delay means, such as the oil buffer 26, may be provided, or the oil connections to regulators 12 and 13 may include devices for throttling the flow of oil between them and the pressure line, thus introducing a lag in the regulation resulting from the pressure changes produced by regulator 11.

The fuel pump 5 and the oil pump 8 are preferably driven by a constant speed motor. They are, therefore, coupled to the motor 27 that drives the circulation water pump 28. Since the motor 7 has generally a lower speed than the compressor and the gas turbine, a gearing 29 is provided.

The same regulation can likewise be carried on in compression firing used for other purposes than generation of steam; for instance, in hot water heaters or heat exchange devices of chemical works, or the like.

I claim:

1. The combination with a pressure fired device comprising means for supplying fuel, means for supplying air for combustion of the fuel under pressure, and means driven by the resulting combustion gases connected to drive said means for supplying air, of a motor associated with said means driven by the combustion gases for regulating the speed thereof, the speed of said motor being controlled in accordance with the operation of said device and means controlled in accordance with the operation of the device for regulating the supply of fuel.

2. The combination as defined in claim 1 in which the motor is of a type capable of wide variation in power output without substantial variation in speed.

3. The combination as defined in claim 1 in which the motor is an electric motor of shunt characteristics.

4. The combination defined in claim 1 in which the pressure fired device is a steam boiler and the speed of the motor is regulated in accordance with the boiler steam pressure.

5. The combination defined in claim 1 in which the pressure fired device is a steam boiler and in which the means driven by the combustion gases is a turbine.

6. In combination with a pressure fired steam boiler comprising means for supplying fuel thereto, means for supplying air under pressure, and means driven by the combustion gases connected to drive said means for supplying air, of a motor connected to assist said means driven by the combustion gas in driving said means for supplying air, a pressure-sensitive device subject to the steam pressure of said steam boiler, and means associated with said pressure-sensitive device for regulating the supply of fuel and the speed of said motor.

7. In combination with a device for utilizing heat, a pressure fired furnace in which the pressure in the combustion chamber thereof is created by a compressor which is driven by a gas turbine which in turn is driven by the products of combustion leaving the combustion chamber, means for regulating the speed of said compressor in accordance with the operation of said device, comprising a motor auxiliary to said gas turbine for driving the compressor, said motor being capable of maintaining a substantially constant speed independent of variations in the power developed by said gas turbine, and means associated with said device for varying the speed of said motor in accordance with its heat requirements.

8. The combination as defined in claim 7 in which the auxiliary motor is an electric motor having shunt characteristics and the means for varying the speed of the motor comprises means for varying the voltage of the electric current supplied to the motor whereby the speed of the motor will remain substantially constant for a given speed adjustment regardless of the load.

CLAUDE SEIPPEL.